(12) United States Patent
Hsieh (10) Patent No.: US 10,625,816 B2
(45) Date of Patent: Apr. 21, 2020

(54) COMPLEX CLEAT FOR CLIPLESS PEDAL

(71) Applicant: Chin-Long Hsieh, Taichung (TW)

(72) Inventor: Chin-Long Hsieh, Taichung (TW)

( * ) Notice: Subject to any disclaimer, the term of this patent is extended or adjusted under 35 U.S.C. 154(b) by 15 days.

(21) Appl. No.: 16/109,732

(22) Filed: Aug. 22, 2018

(65) Prior Publication Data

US 2020/0062338 A1   Feb. 27, 2020

(51) Int. Cl.
*B62M 3/08* (2006.01)
*A43B 5/14* (2006.01)

(52) U.S. Cl.
CPC ............ *B62M 3/086* (2013.01); *A43B 5/14* (2013.01); *Y10T 74/217* (2015.01)

(58) Field of Classification Search
CPC ......... B62M 3/086; B62M 3/083; A43B 5/14; Y10T 74/217
See application file for complete search history.

(56) References Cited

U.S. PATENT DOCUMENTS

| 4,936,164 | A | * | 6/1990 | Forke | B62M 3/086 |
| | | | | | 36/131 |
| 8,646,359 | B2 | * | 2/2014 | Hsieh | B62M 3/086 |
| | | | | | 74/594.6 |
| 9,511,817 | B2 | * | 12/2016 | Bryne | B62M 3/086 |
| 2005/0188567 | A1 | * | 9/2005 | Chretien | A43B 5/14 |
| | | | | | 36/131 |

* cited by examiner

*Primary Examiner* — Jeremy R Severson (57) ABSTRACT

Disclosed is a cleat for being releasably secured to a clipless pedal. The cleat includes a base plate, a front engagement member, a rear engagement member and an anti-slip pad. The base plate is used for being fastened to a sole of a shoe and has a front tip, a rear end and a middle area between the front tip and the rear end. The front engagement member is mounted on a top side of the front tip. The rear engagement member is mounted on a top side of the rear end. The anti-slip pad is mounted on a bottom side of the middle area. Both the front engagement member and the rear engagement member are higher than the base plate in hardness and the base plate is higher than the anti-slip pad in hardness.

5 Claims, 13 Drawing Sheets

COMPLEX CLEAT FOR CLIPLESS PEDAL

BACKGROUND OF THE INVENTION

1. Technical Field

This invention relates generally to cleat assemblies configured for releasable securement to pedals for bicycles, particularly, to cleat assemblies incorporating multiple materials for various purposes.

2. Related Art

Clipless pedals (also known as "clip-in" or "step-in" pedals) require a cleat fitted to the sole of a rider's shoe, which locks to the pedal and thus holds the shoe firmly to the pedal. Clipless pedals take a variety of forms and are typically adapted for the demands of a particular type of cycling, such as road cycling and off-road or mountain biking.

A cleat for road cycling is a substantially triangular plate with a front tip, a rear end and a middle area therebetween. The front tip and the rear end are engaged with a front blocker and a rear hook of a clipless pedal, respectively. For the sake of lightweighting, a cleat is usually made of plastic with a medium hardness. However, the front tip and the rear end of such a plastic cleat must be frequently engaged and disengaged with a metal clipless pedal, so the front tip and the rear end are easy to be worn down.

On the other hand, when the cleat is disengaged from a clipless pedal and the user is walking about on the ground, the cleat's bottom surface is in direct contact with the ground. The bottom surface only has very limited friction with the ground, so such direct contact requires the user to take care when walking about. This direct contact also has led to undesired wear of the cleat body.

SUMMARY OF THE INVENTION

An object of the invention is to provide a complex cleat for a clipless bicycle pedal, which reinforces a front tip and a rear end to resist wear and adds a soft pad for anti-slip when walking.

To accomplish the above object, the cleat of the invention includes a base plate, a front engagement member, a rear engagement member and an anti-slip pad. The base plate is used for being fastened to a sole of a shoe and has a front tip, a rear end and a middle area between the front tip and the rear end. The front engagement member is mounted on a top side of the front tip. The rear engagement member is mounted on a top side of the rear end. The anti-slip pad is mounted on a bottom side of the middle area. Both the front engagement member and the rear engagement member are higher than the base plate in hardness and the base plate is higher than the anti-slip pad in hardness.

DETAILED DESCRIPTION OF THE INVENTION

Specific, non-limiting embodiments of the present invention will now be described with reference to the drawings. It should be understood that such embodiments are by way of example only and merely illustrative of but a small number of embodiments within the scope of the present invention. Various changes and modifications obvious to one skilled in the art to which the present invention pertains are deemed to be within the spirit, scope and contemplation of the present invention as further defined in the appended claims.

With reference now to the illustrative drawings, various embodiments of a cleat are described and shown. The cleats described herein are designed to be secured to the underside of the sole of a rider's shoe (not shown), and are configured to be attachable to a pedal.

In the following description, the term "front" means a direction toward the toe of a rider's shoe, the term "rear" means a direction toward the heel of a rider's shoe, the term "outer" means a direction which is opposite to an arch of a rider's shoe, the term "inner" means a direction toward an arch of a rider's shoe, the term "top side" means a side facing a sole of a rider's shoe, and the term "bottom side" means a side facing a pedal.

Figure 6:
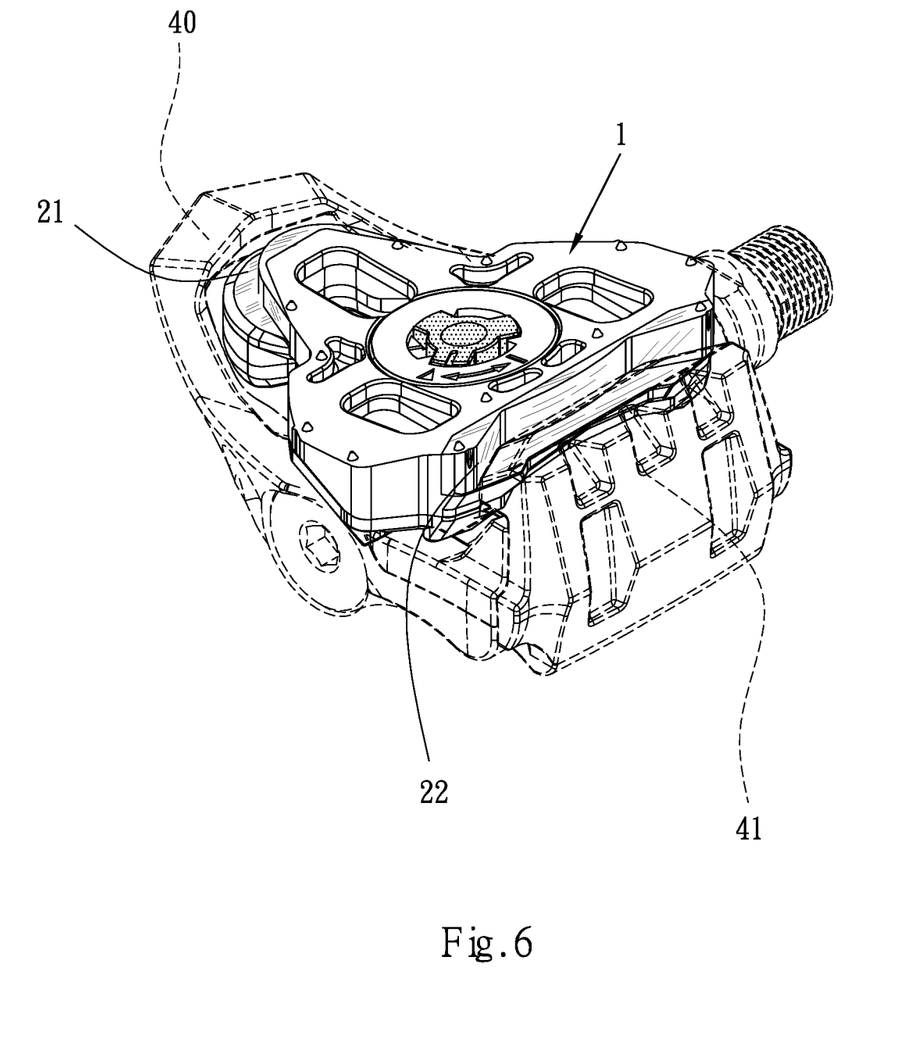
FIG. 6 is a schematic view of the first embodiment of the invention engaged with a pedal.

Please refer to FIGS. 1-4. The invention includes a base plate 10. A top side of the base plate 10 is used for being fastened to a sole 51 of a shoe 50. The base plate 10 has a front tip 10a, a rear end 10b and a middle area 10c between the front tip 10a and the rear end 10b. A front engagement member 21 is mounted on a top side of the front tip 10a. A rear engagement member 22 is mounted on a top side of the rear end 10b. An anti-slip pad 31 is mounted on a bottom side of the middle area 10c. Preferably, a central anti-slip pad 32 may be added, which passes through the anti-slip pad 31 to fasten to the middle area 10c of the base plate 10. The front tip 10a with the front engagement member 21 and the rear end 10b with the rear engagement member 22 are engaged with a front blocker and a rear hook of a clipless pedal, respectively (as shown in FIG. 6). The base plate 10, the front engagement member 21, the rear engagement member 22 and the anti-slip pad 31 are attached to form a single body. Both the front engagement member 21 and the rear engagement member 22 are higher than the base plate 10 in hardness and the base plate 10 is higher than the anti-slip pad 31 in hardness. As a result, both the front engagement member 21 and the rear engagement member 22 can reduce wear with the pedal blocker and hook, and the anti-slip pad 31 possesses a higher friction coefficient than the base plate 10 to make the cleat 1 walkable on the ground when a rider disengages the cleat 1 from a pedal.

In implementation, the front engagement member 21 and the rear engagement member 22 may be made of a ceramic material with ultra-high hardness or polyoxymethylene (POM), the base plate 10 may be made of a complex material or glass-filled nylon and both the anti-slip pad 31 and the central anti-slip pad 32 may be made of thermoplastic polyurethane (TPU), rubber, imitation rubber or plastic.

The central anti-slip pad 32 is formed with a fixing bar 321. The middle area 10c of the base plate 10 is formed with a fixing hole 11 corresponding to the fixing bar 321. An edge of the fixing hole 11 is formed with a recess 111 and a periphery of the fixing bar 321 is formed with a protrusion 322, so that the fixing bar 321 can be fastened into the fixing hole 11 by engaging the protrusion 322 with the recess 111. The anti-slip pad 31 has a through hole 35 for being passed by the central anti-slip pad 32.

The top side of the rear end 10b of the base plate 10 is formed with a recession 14 with multiple sides and the rear engagement member 22 is a shape 221 corresponding to the recession 14. This can enhance strength of connection therebetween.

Figure 1:
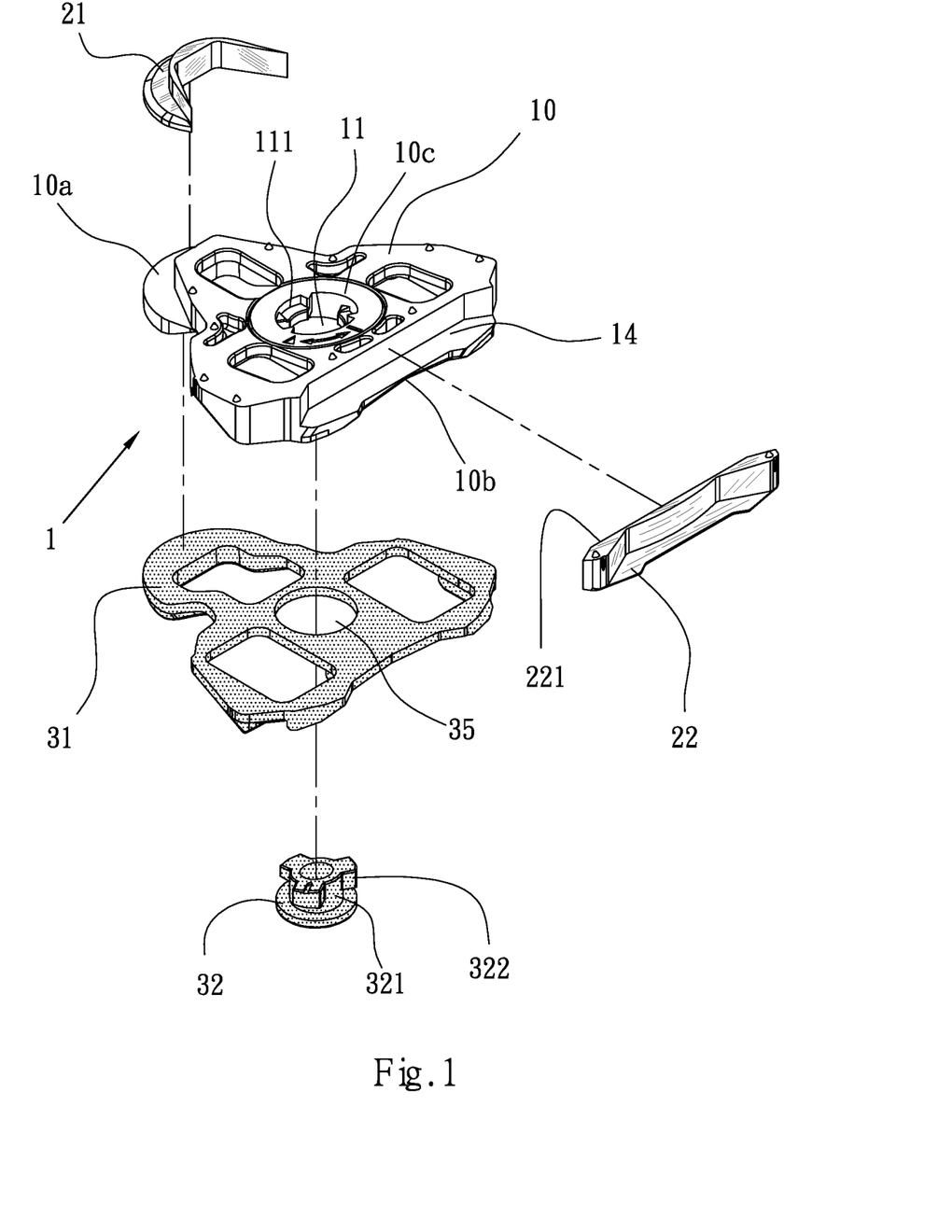
FIG. 1 is an exploded view of the first embodiment of the invention from a top view point.
Figure 2:
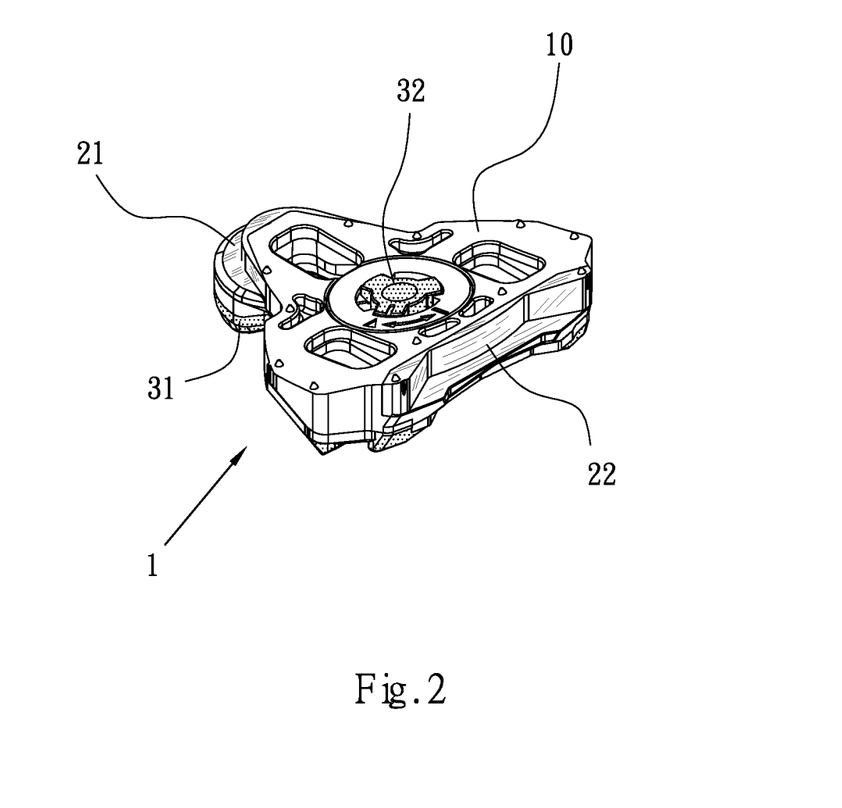
FIG. 2 is a perspective view of the first embodiment of the invention from a top view point.
Figure 3:
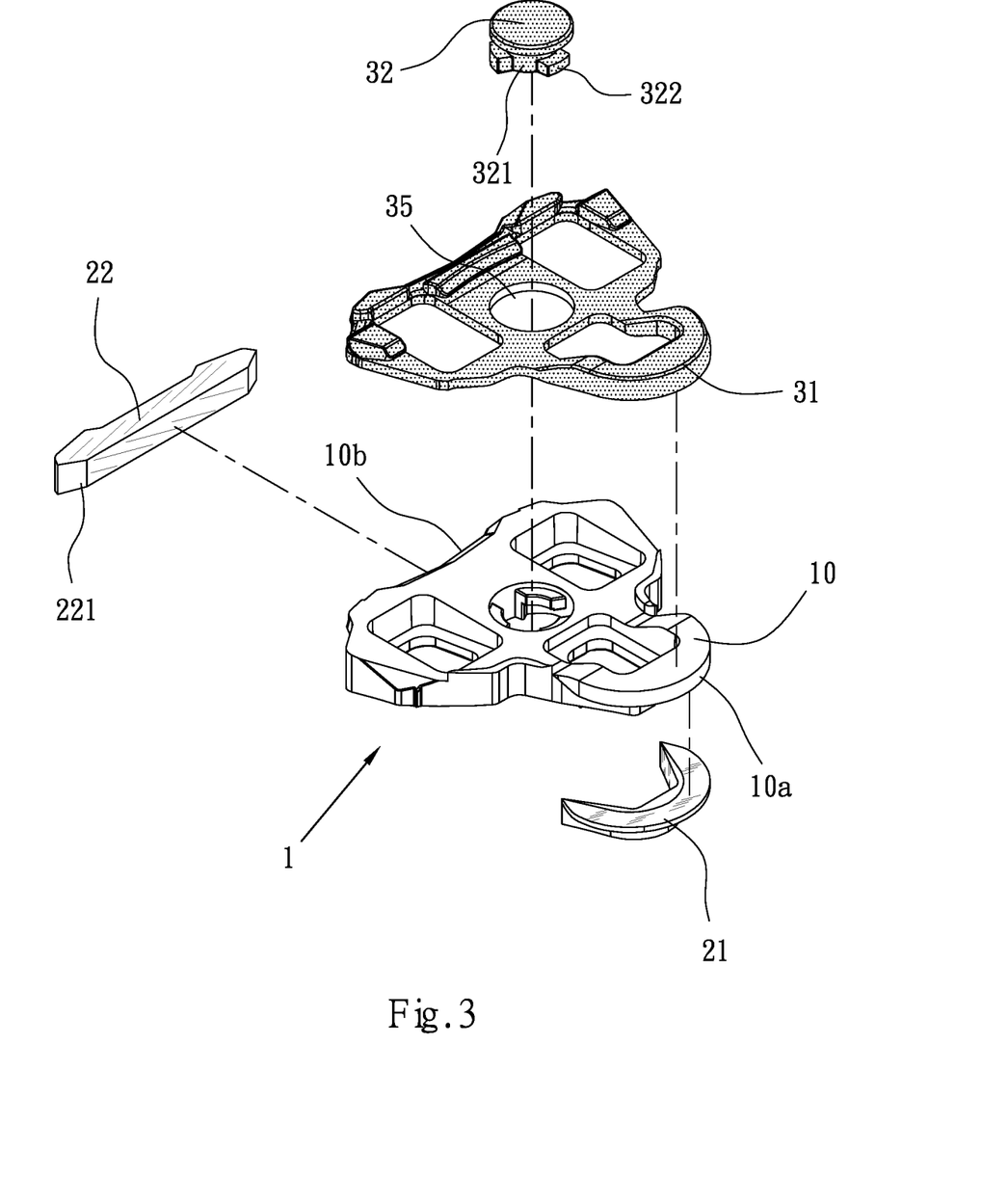
FIG. 3 is an exploded view of the first embodiment of the invention from a bottom view point.
Figure 4:
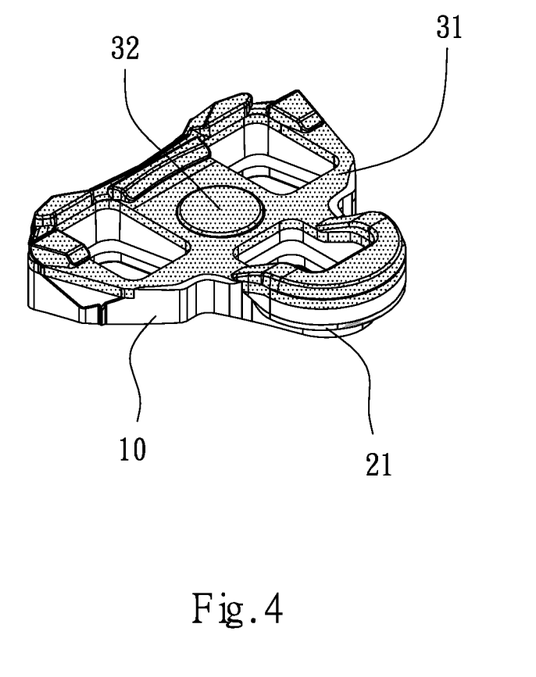
FIG. 4 is a perspective view of the first embodiment of the invention from a bottom view point.
Figure 5:
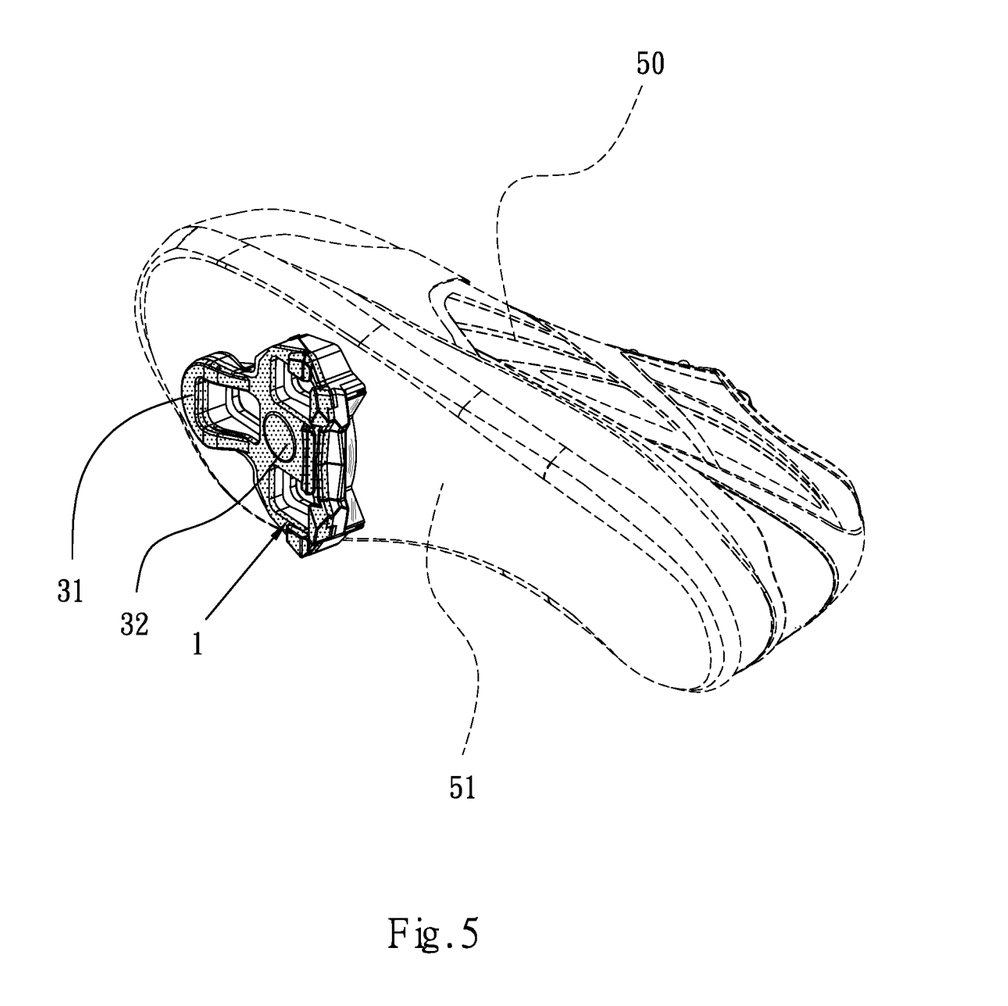
FIG. 5 is a schematic view of the first embodiment of the invention attached on a sole of a bicycling shoe.

Please refer to FIG. 5, which is a schematic view of the cleat 1 attached on a sole 51 of a bicycling shoe 50. When a rider leaves his or her bicycle to walk on the ground, the cleat 1 touches the ground with its anti-slip pad 31 and central anti-slip pad 32 instead of the base plate 10. As a result, it is safer for the rider.

Please refer to FIG. 6. When the cleat 1 attached on the sole 51 is engaged with a pedal 40, the front engagement member 21 and the rear engagement member 22 engage with the front blocker 41 and the rear hook 42. The front blocker 40 and the rear hook 41 at every engaging or disengaging will wear down the front engagement member 21 and the rear engagement member 22. However, because the front and rear engagement members 21, 22 are made of a material with a high hardness and low friction, they are wear-resistant and easy to engage or disengage.

Figure 7:
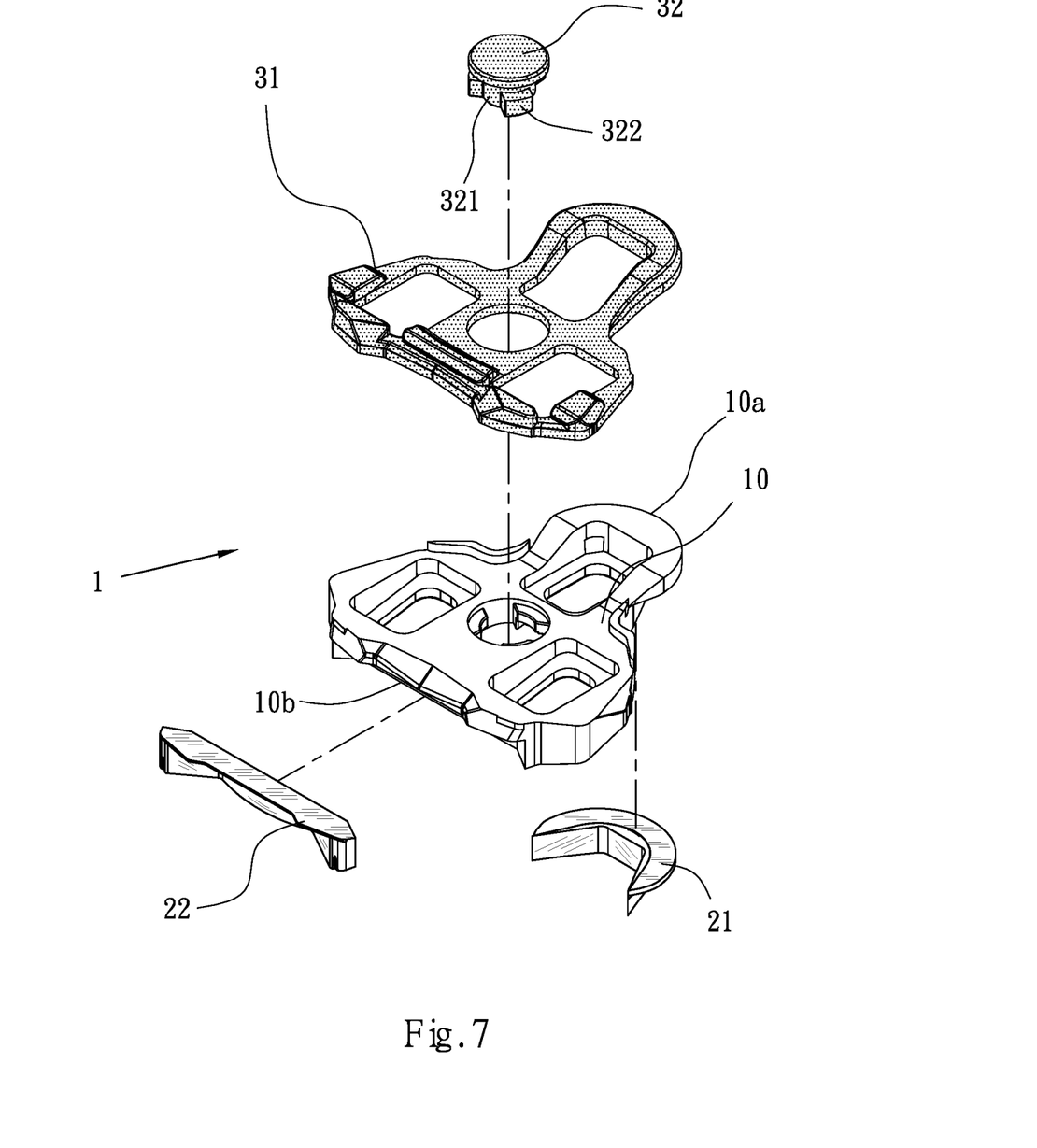
FIG. 7 is another exploded view of the first embodiment of the invention from a bottom view point.
Figure 8:
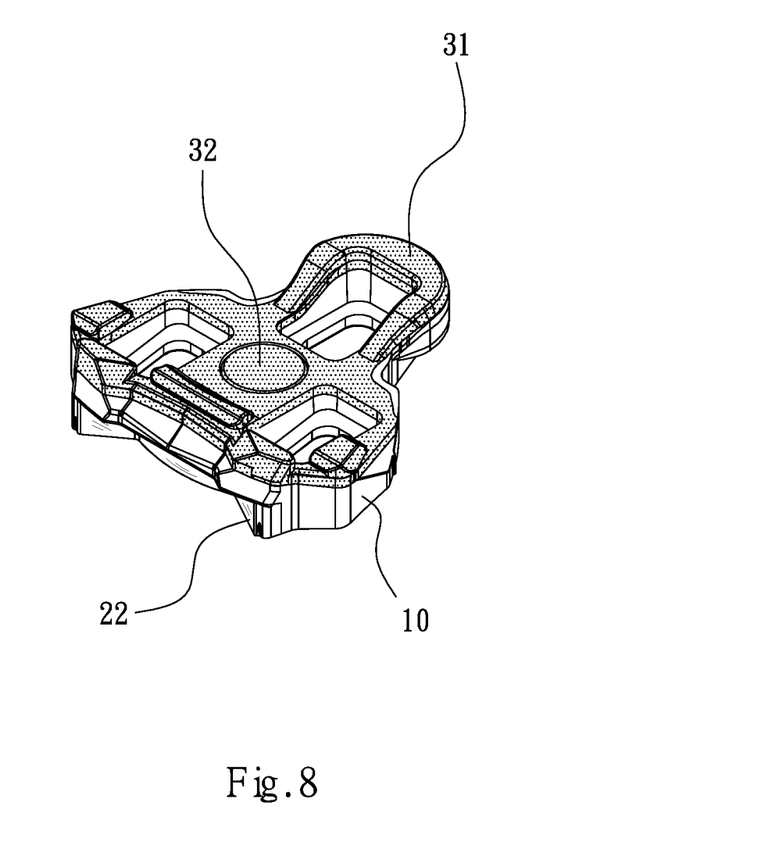
FIG. 8 is another perspective view of the first embodiment of the invention from a bottom view point.
Figure 9:
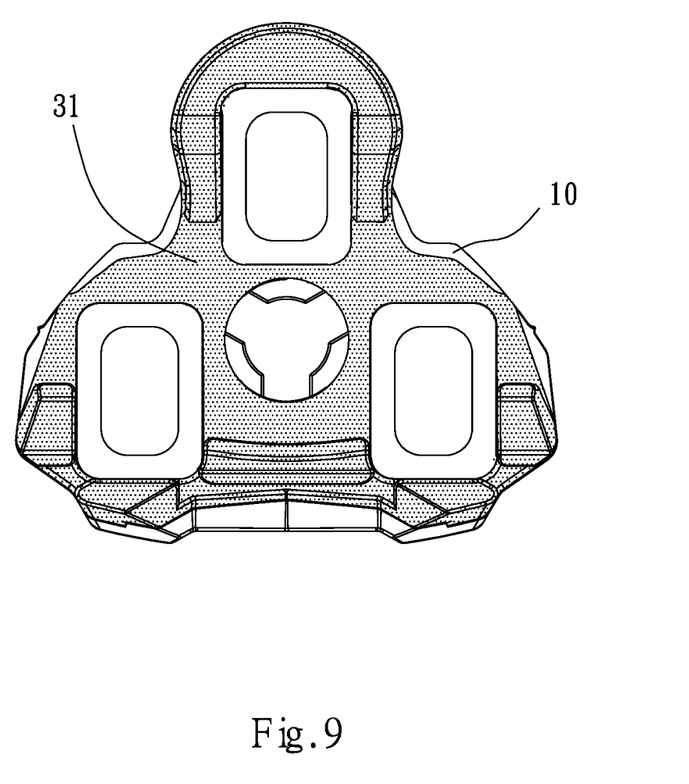
FIG. 9 is a bottom plan view of the first embodiment of the invention.
Figure 10:
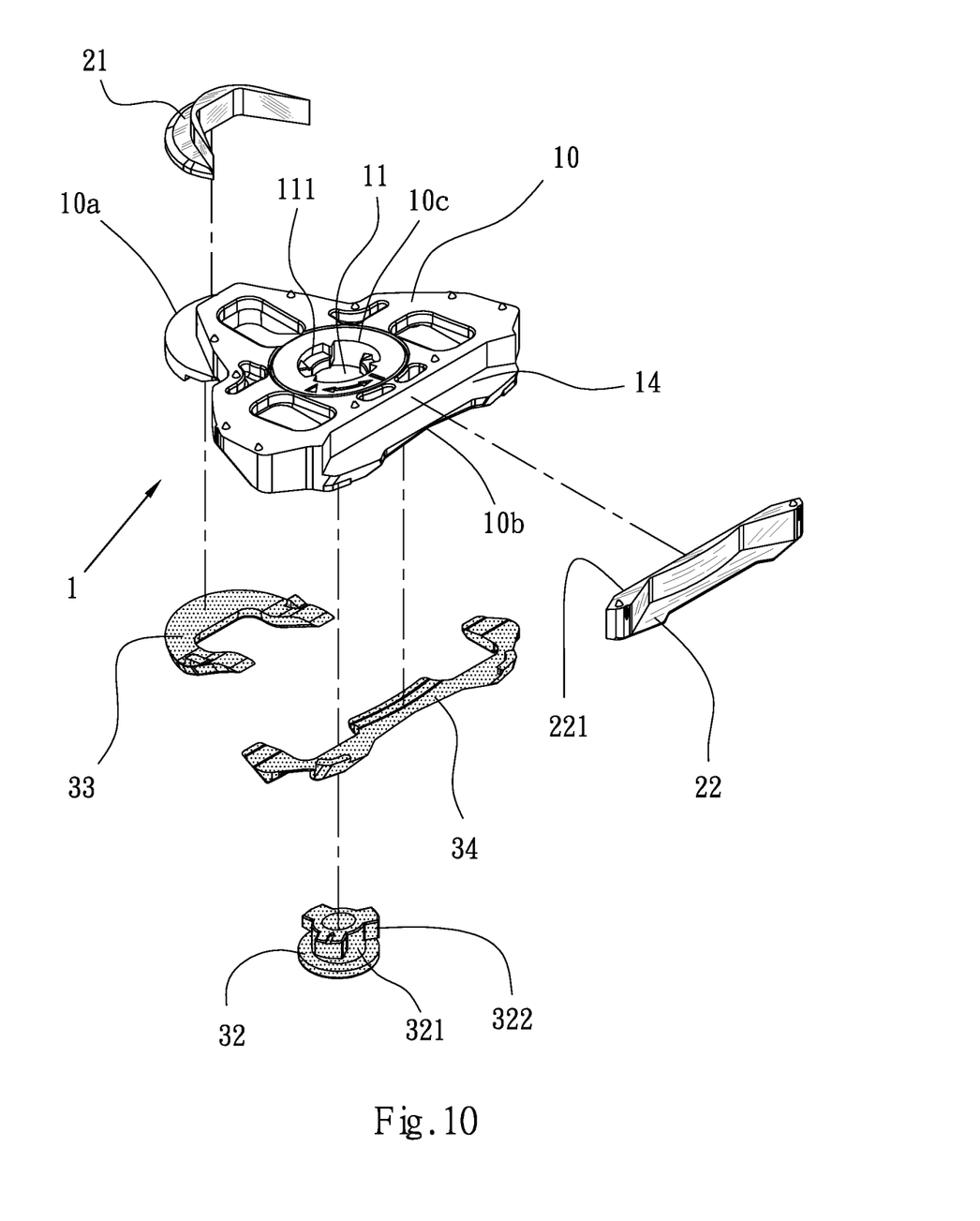
FIG. 10 is an exploded view of the second embodiment of the invention from a top view point.
Figure 11:
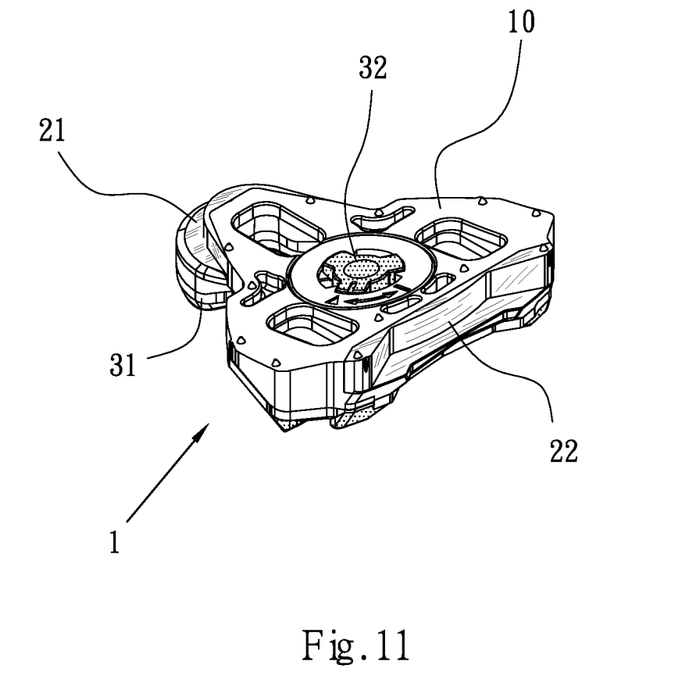
FIG. 11 is a perspective view of the second embodiment of the invention from a top view point.
Figure 12:
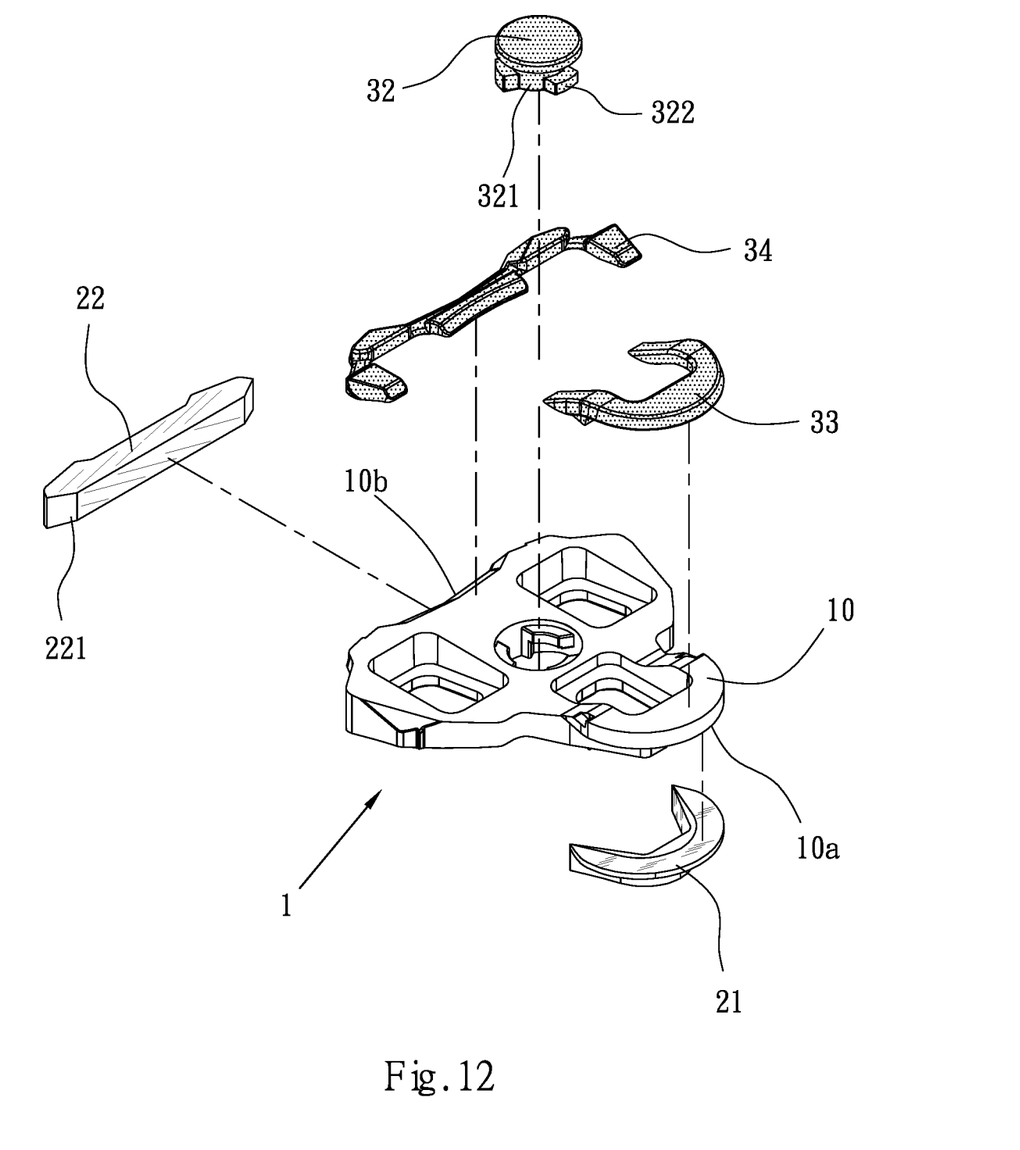
FIG. 12 is an exploded view of the second embodiment of the invention from a bottom view point.
Figure 13:
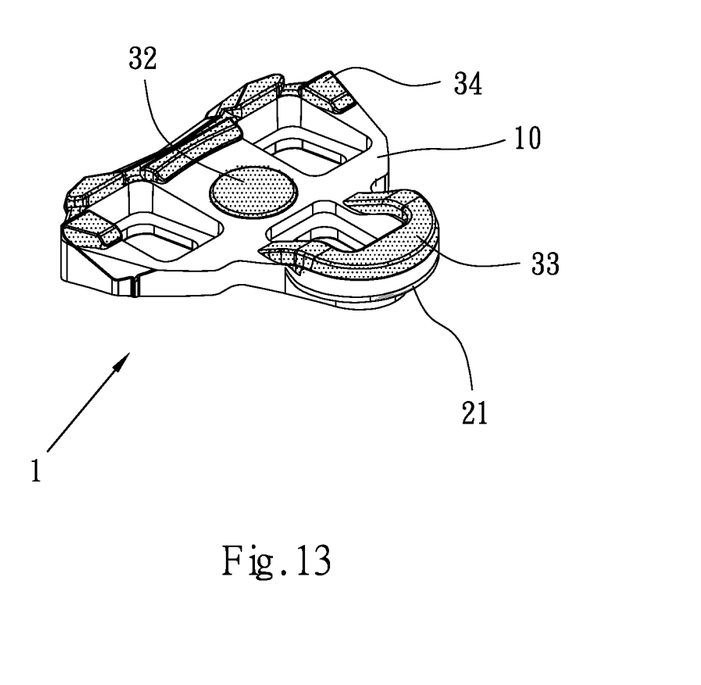
FIG. 13 is a perspective view of the second embodiment of the invention from a bottom view point.

Please refer to FIGS. 7-9. The anti-slip pad 31 may have the same area and shape as the base plate 10. They can be formed by injection molding. This can obtain better strength of connection and a better anti-slip effect.

Please refer to FIGS. 10-13, which show another embodiment of the invention. In this embodiment, the anti-slip pad is divided into a front anti-slip pad 33, a central anti-slip pad 32 and a rear anti-slip pad 34. The front anti-slip pad 33, a central anti-slip pad 32 and a rear anti-slip pad 34 are mounted on the bottom side of the front tip 10a, middle area 10c and rear end 10b of the base plate 10. The front anti-slip pad 33 is of a U-shape and the rear anti-slip pad 34 is of a substantial W-shape. As the above embodiment, the front engagement member 21 and the rear engagement member 22 may be made of a ceramic material with ultra-high hardness or polyoxymethylene (POM), the base plate 10 may be made of a complex material or glass-filled nylon, and the front anti-slip pad 33, a central anti-slip pad 32 and a rear anti-slip pad 34 may be made of thermoplastic polyurethane (TPU), rubber, imitation rubber or plastic.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

What is claimed is:

1. A cleat for being releasably secured to a clipless pedal, comprising:
    a base plate, used for being fastened to a sole of a shoe, having a front tip, a rear end and a middle area between the front tip and the rear end;
    a front engagement member mounted on a top side of the front tip;
    a rear engagement member mounted on a top side of the rear end; and
    an anti-slip pad mounted on a bottom side of the middle area;
    wherein both the front engagement member and the rear engagement member are higher than the base plate in hardness and the base plate is higher than the anti-slip pad in hardness.

2. The cleat of claim 1, wherein both the front engagement member and the rear engagement member are made of a ceramic material or polyoxymethylene (POM), the base plate is made of a complex material or glass-filled nylon, and the anti-slip pad is made of thermoplastic polyurethane (TPU), rubber, imitation rubber or plastic.

3. The cleat of claim 1, further comprising a central anti-slip pad with a fixing bar, wherein the fixing bar is inserted into a fixing hole formed in the middle area of the cleat to fasten the anti-slip pad.

4. The cleat of claim 3, wherein the central anti-slip pad is made of thermoplastic polyurethane (TPU), rubber, imitation rubber or plastic.

5. The cleat of claim 3, wherein an edge of the fixing hole is formed with a recess and a periphery of the fixing bar is formed with a protrusion, so that the fixing bar is fastened into the fixing hole by engaging the protrusion with the recess.

* * * * *